US010659261B2

(12) United States Patent
Miyamoto et al.

(10) Patent No.: US 10,659,261 B2
(45) Date of Patent: May 19, 2020

(54) RADIO COMMUNICATION SYSTEM AND RADIO COMMUNICATION METHOD (71) Applicant: NIPPON TELEGRAPH AND TELEPHONE CORPORATION, Tokyo (JP)

(72) Inventors: Kenji Miyamoto, Yokosuka (JP); Jun Terada, Yokosuka (JP); Tatsuya Shimizu, Yokosuka (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 16/343,994

(22) PCT Filed: Nov. 6, 2017

(86) PCT No.: PCT/JP2017/039881
§ 371 (c)(1),
(2) Date: Apr. 22, 2019

(87) PCT Pub. No.: WO2018/088344
PCT Pub. Date: May 17, 2018

(65) Prior Publication Data
US 2019/0238372 A1 Aug. 1, 2019

(30) Foreign Application Priority Data
Nov. 11, 2016 (JP) .................. 2016-220513

(51) Int. Cl.
*H04L 25/03* (2006.01)
*H04L 25/06* (2006.01)
(Continued)

(52) U.S. Cl.
CPC ....... *H04L 25/03318* (2013.01); *H04B 7/022* (2013.01); *H04L 25/0204* (2013.01);
(Continued)

(58) Field of Classification Search
CPC ............... H04L 25/03318; H04L 27/00; H04L 25/0224; H04L 25/0204; H04L 25/067; H04W 88/08; H04W 92/12; H04B 7/022
See application file for complete search history.

(56) References Cited

U.S. PATENT DOCUMENTS 9,319,197 B2 * 4/2016 Sahin ..................... H04L 1/0025
2015/0063373 A1 * 3/2015 Savaglio ............... H04W 88/08
370/466

(Continued)

FOREIGN PATENT DOCUMENTS

EP 3089389 A1 11/2016
WO WO-2016140303 A1 9/2016

OTHER PUBLICATIONS

Kenji Miyamoto et al., Proposal on Functional-Split Scheme of Base Stations for Future Radio Access, IEICE Technical Report, CS2015-15, pp. 33-38, Jul. 2015.

(Continued)

Primary Examiner — Kenneth T Lam
(74) Attorney, Agent, or Firm — Harness, Dickey & Pierce, P.L.C.

(57) ABSTRACT

A radio communication system includes a radio apparatus and a signal processing apparatus that function as a base station, and the radio apparatus includes a channel estimation unit that, on the basis of a radio signal transmitted from a terminal apparatus, estimates channel information relating to a radio transmission path between the radio apparatus and the terminal apparatus; a demodulation unit that performs soft-decision demodulation of the radio signal on the basis of the channel information estimated by the channel estimation unit; a signal switching unit that, depending on the terminal apparatus that transmitted the radio signal, switches an output destination of a log likelihood ratio obtained by the soft-decision modulation between either a first path passing (Continued)

through a decoding unit that decodes the log likelihood ratio or a second path not passing through the decoding unit; and a transmission unit that transmits a signal output from the first path or the second path to the signal processing apparatus.

4 Claims, 4 Drawing Sheets

(51) Int. Cl.
    *H04L 25/02*     (2006.01)
    *H04W 92/12*     (2009.01)
    *H04B 7/022*     (2017.01)
    *H04W 88/08*     (2009.01)
    *H04L 27/00*     (2006.01)

(52) U.S. Cl.
    CPC ........ *H04L 25/0224* (2013.01); *H04L 25/067* (2013.01); *H04L 27/00* (2013.01); *H04W 88/08* (2013.01); *H04W 92/12* (2013.01)

(56) References Cited

U.S. PATENT DOCUMENTS

| | | | | |
|---|---|---|---|---|
| 2016/0242147 | A1* | 8/2016 | Tarlazzi | H04W 72/042 |
| 2017/0238361 | A1* | 8/2017 | Pawar | H03M 7/40 |
| | | | | 455/561 |
| 2017/0373890 | A1* | 12/2017 | Fertonani | H04L 25/02 |
| 2019/0069278 | A1* | 2/2019 | Miyamoto | H04W 88/08 |
| 2019/0089562 | A1* | 3/2019 | Miyamoto | H04L 25/0202 |
| 2019/0288752 | A1* | 9/2019 | Suh | H04L 1/0625 |

OTHER PUBLICATIONS

Tomoaki Ohtsuki, Communication Technology: Basic Knowledge and Its Trend[III]:Error-Correction Coding, IEICE, vol. 90, No. 7, pp. 549-555, Jul. 2007.

Hidekazu Taoka et al., MIMO and CoMP in LTE-Advanced, NTT DOCOMO Technical Journal vol. 18, No. 2, pp. 22-30, 2010.

Akihiro Saito et al., Development of Multi-Base-Station Cooperative Transmission System, Panasonic Techincal Journal, vol. 58, No. 4, p. 20-25, Jan. 2013.

Miyamoto, Kenji et al., Uplink joint reception with LLR forwarding for optical transmission bandwidth reduction in mobile fronthaul, Vehicular Technology Conference (VTC Spring), 2015 IEEE 81st, IEEE, May 14, 2015.

Shibata, Naotaka et al., A study of uplink throughput in base station architecture splitting LTE physical layer functions, Proceedings of the 2015 Society Conference of IEICE (1), Aug. 25, 2015, p. 291.

Miyamoto, Kenji et al., Experimental evaluation of mobile fronthaul optical bandwidth and wireless transmission performance for base station architecture splitting LTE PHY layer functions in uplink, Proceedings of the 2016 IEICE General Conference, Communication (2), Mar. 1, 2016, p. 230.

International Search Report (English and Japanese) and Written Opinion (in Japanese) issued in International Application No. PCT/JP2017/039881, dated Jan. 16, 2018; ISA/JP.

Extended European Search Report from counterpart EP178694329, dated Mar. 26, 2020.

* cited by examiner

RADIO COMMUNICATION SYSTEM AND RADIO COMMUNICATION METHOD

CROSS-REFERENCE TO RELATED APPLICATIONS

This application is a 371 U.S. National Stage of International Application No. PCT/JP2017/039881, filed on Nov. 6, 2017, which claims priority to Japanese Application No. 2016-220513, filed on Nov. 11, 2016. The entire disclosures of the above applications are incorporated herein by reference.

TECHNICAL FIELD

The present invention relates to a radio communication system and a radio communication method.

BACKGROUND ART

Figure 3:
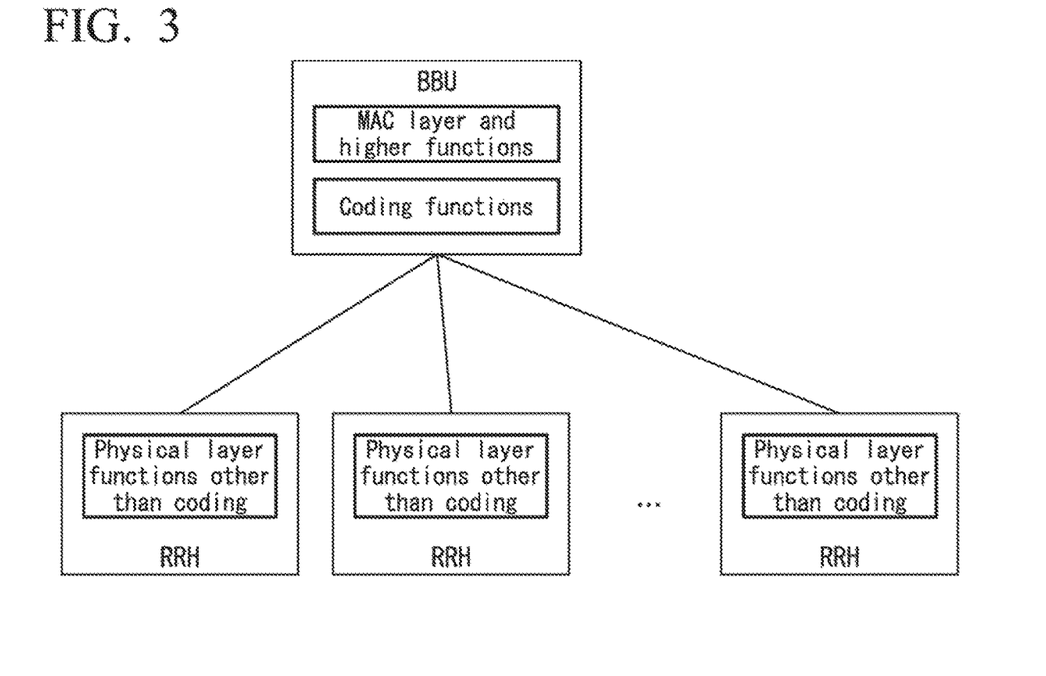
FIG. 3 is a diagram showing an example of an SPP functional splitting scheme.

Conventionally, in order to raise the flexibility of base station installation in radio communication systems, particularly mobile communication systems, configurations in which the functions of a base station are distributed between two apparatuses, namely, a BBU (Base Band Unit) and an RRH (Remote Radio Head), and the BBU and RRH are physically separated, have been considered. As one mode for functional splitting schemes between a BBU and an RRH, a functional splitting scheme in which the functions of the MAC (Media Access Control) layer and higher, and the coding functions, which are a part of the physical layer functions, are performed by a BBU, and the functions of the physical layer other than the coding functions are performed by RRHs, as shown in FIG. 3, has been considered (see, e.g., Non-Patent Document 1). This functional splitting scheme is called an SPP (Split-PHY Processing) scheme.

As schemes for demodulating radio signals received in a base station or a terminal apparatus, there are soft-decision demodulation schemes in which, instead of outputting signal bits obtained by demodulation as bit values 0 or 1, the signal bits are output as real-value ratios called likelihoods, indicating the probability that a signal bit is 0 or 1 (see, e.g., Non-Patent Document 2). In a soft-decision demodulation scheme, the output obtained by demodulation is called the LLR (Log Likelihood Ratio). In general, the larger the LLR value is in the positive direction, the higher the probability that the signal bit is 1, and the lower the value is in the negative direction (i.e., the higher the absolute value), the higher the probability that the signal bit is 0.

Additionally, in a mobile communication system, the area covered by a single RRH is referred to as a cell, and in general, the coverage areas of multiple adjacent cells overlap. For this reason, when a terminal apparatus is located near a cell edge, there is a problem in that the radio signals being exchanged between the terminal apparatus and a desired RRH can encounter interference from radio signals exchanged between the terminal apparatus and the RRH of an adjacent cell, thereby significantly reducing the radio transmission rate. As a means for solving such a problem, CoMP (Coordinated Multi-Point transmission/reception) (base station cooperation) technology, in which adjacent RRHs cooperate with each other to communicate with a terminal apparatus located near the cell edges, as shown, for example, in FIG. 4, has been considered (see, e.g., Non-Patent Document 3).

Figure 4:
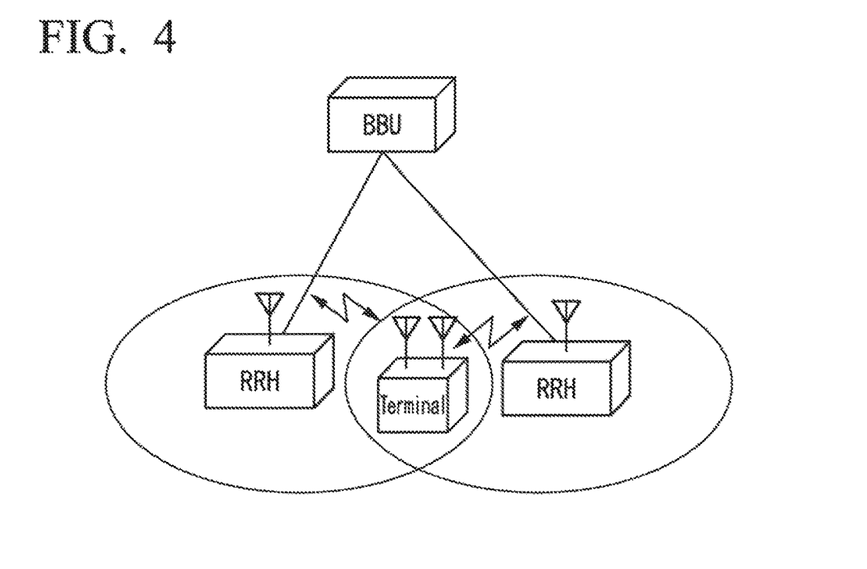
FIG. 4 is a diagram showing a system configuration using CoMP technology.

In FIG. 4, there are two cooperating RRHs, but there may be two or more RRHs. The possibility of installing RRHs at a high density and having multiple RRHs constantly performing CoMP with respect to multiple terminal apparatuses, regardless of whether or not the terminal apparatuses are located at the cell edges, thereby increasing the system capacity, has been considered for use in future mobile communication systems. As one CoMP technique on an uplink (the direction from the RRHs to the BBU), a technique in which an SPP functional splitting scheme is applied, LLRs obtained in the respective RRHs are transmitted to the BBU, and the BBU combines the LLRs obtained by the respective RRHs has been considered. With this technique, the RRHs are notified beforehand, by means of the MAC layer function in the BBU, whether or not CoMP is to be performed for a terminal apparatus communicating with the RRHs (see Non-Patent Document 4).

Figure 5:
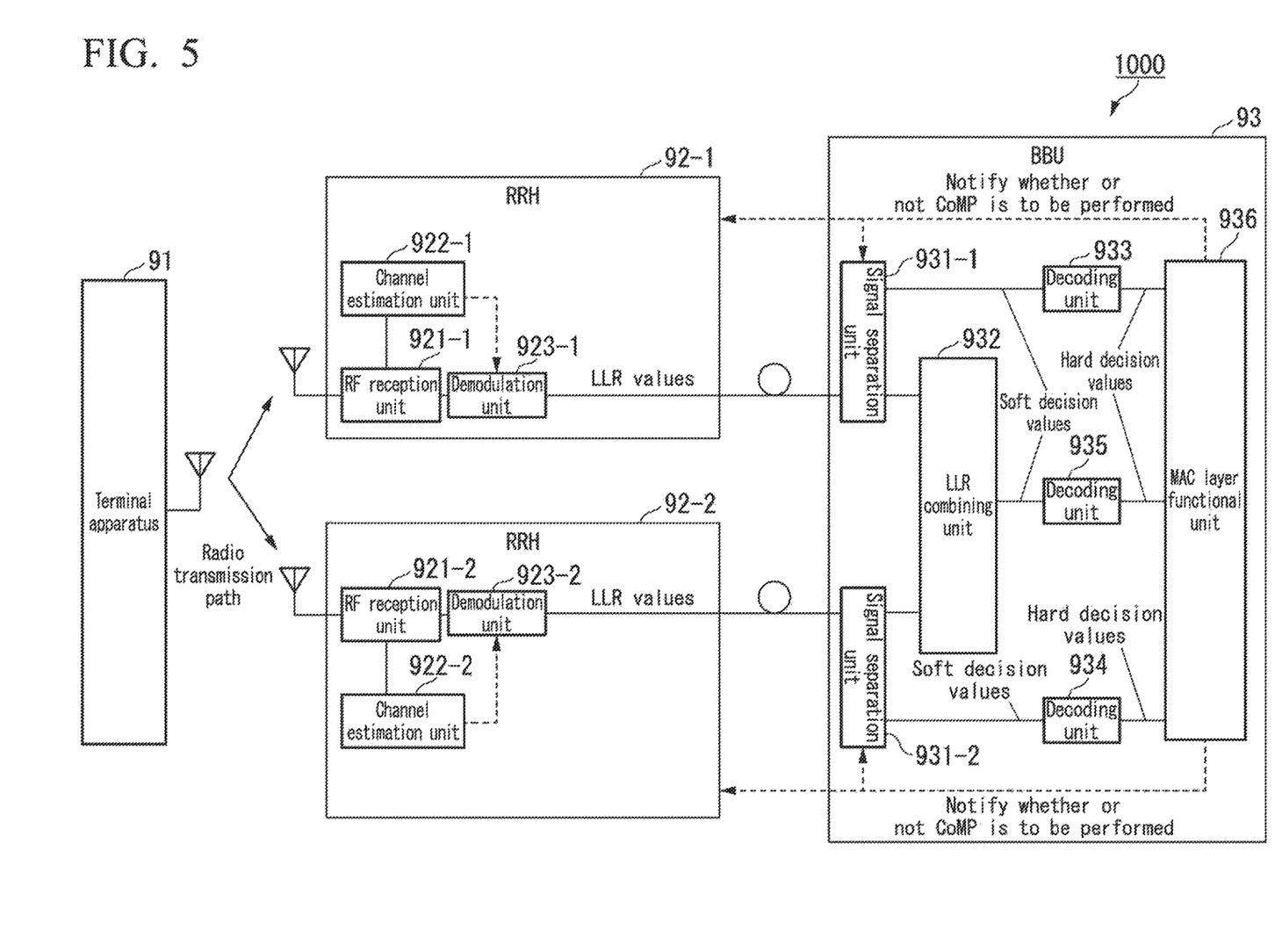
FIG. 5 is a diagram showing an example of a system configuration of a radio communication system that performs uplink LLR-combined signal transmission in conventional SPP.

FIG. 5 is a diagram showing an example of a system configuration of a radio communication system 1000 that performs uplink LLR-combined signal transmission in conventional SPP. The radio communication system 1000 includes a terminal apparatus 91, multiple RRHs 92-1 and 92-2, and a BBU 93. The RRHs 92-1 and the 92-2 are provided with similar structures, so the RRH 92-1 will be explained as an example.

The RRH 92-1 includes an RF (Radio Frequency) reception unit 921-1, a channel estimation unit 922-1, and a demodulation unit 923-1. The BBU 93 includes a signal separation unit 931-1, a signal separation unit 931-2, an LLR combining unit 932, a decoding unit 933, a decoding unit 934, a decoding unit 935, and a MAC layer functional unit 936.

The RF reception unit 921-1 receives signals transmitted from the terminal apparatus 91. Of the received signals, the RF reception unit 921-1 outputs reference signals to the channel estimation unit 922-1, and outputs data signals to the demodulation unit 923-1. The reference signals are signals for extracting channel information relating to the radio transmission path, and include signals that are known between the terminal apparatus and the RRHs. The data signals are signals that are to be transmitted to the BBU, including a series of signal bits.

The channel estimation unit 922-1 estimates the channel information and measures the reception quality on the radio transmission path on the basis of the reference signals output from the RF reception unit 921-1. The channel estimation unit 922-1 outputs the channel information estimation result and the reception quality measurement result to the demodulation unit 923-1. The demodulation unit 923-1 uses the channel information estimation result and the reception quality measurement result output from the channel estimation unit 922-1 to obtain LLR values (soft decision values) by performing equalization and soft-decision demodulation on the received data signals. The demodulation unit 923-1 transmits the obtained LLR values (soft decision values) to the BBU 93.

The signal separation units 931-1 and 931-2 in the BBU 93 output, to the LLR combining unit 932, the LLR values of signals transmitted from a terminal apparatus 91 for which CoMP is performed, on the basis of the information regarding whether or not CoMP is to be performed, for which notification is provided by the MAC layer functional unit 936. On the other hand, the signal separation unit 931-1 outputs, to the decoding unit 933, the LLR values of signals transmitted from a terminal apparatus 91 for which CoMP is not to be performed, and the signal separation unit 931-2 outputs, to the decoding unit 934, the LLR values of signals transmitted from the terminal apparatus 91 for which CoMP is not to be performed. In this case, the information regarding whether or not CoMP is to be performed is a flag providing notification as to whether or not CoMP is to be performed for a terminal apparatus 91 associated with each RRH 92. The value of the flag is represented by, for example, 0 or 1, such that a flag value of 0 indicates that CoMP is not to be performed for the terminal apparatus 91, and a flag value of 1 indicates that CoMP is to be performed for the terminal apparatus 91.

The LLR combining unit 932 combines the LLR values outputted from the signal separation units 931-1 and 931-2, and outputs the combined LLR values to the decoding unit 935.

The decoding unit 933 decodes the LLR values output from the signal separation unit 931-1 to restore the signal bit data (hard decision values). The decoding unit 933 outputs the restored signal bit data to the MAC layer functional unit 936.

The decoding unit 934 decodes the LLR values output from the signal separation unit 931-2 to restore the signal bit data (hard decision values). The decoding unit 934 outputs the restored signal bit data to the MAC layer functional unit 936.

The decoding unit 935 decodes the combined LLR values output from the LLR combining unit 932 to restore the signal bit data (hard decision values). The decoding unit 935 outputs the restored signal bit data to the MAC layer functional unit 936.

The MAC layer functional unit 936 outputs the signal bit data output by the decoding unit 933, the decoding unit 934, and the decoding unit 935 to a higher layer. Additionally, the MAC layer functional unit 936 determines, on the basis of the signals transmitted from a terminal apparatus 91, whether or not CoMP is to be performed on the terminal apparatus 91 that transmitted the signals. Specifically, the MAC layer functional unit 936 monitors the communications of the RRHs 92-1 and 92-2, and if the received signal intensity from a terminal apparatus 91 within the cells of the RRHs 92-1 and 92-2 is less than a threshold value, determines that CoMP is to be performed on the terminal apparatus 91. The MAC layer functional unit 936 notifies the RRHs 92-1 and 92-2, and the signal separation units 931-1 and 931-2 of the information indicating whether or not there is a terminal apparatus 91 for which CoMP is to be performed.

As described above, with an SPP base station functional splitting scheme, LLR-combined CoMP is used to input more highly reliable LLR values to the decoding unit 935 for decoding, thereby decreasing the bit errors in the radio signals and improving the radio transmission characteristics.

PRIOR ART DOCUMENTS

Non-Patent Documents

Non-Patent Document 1: Kenji MIYAMOTO et al., "Proposal on Functional-Split Scheme of Base Stations for Future Radio Access", IEICE Technical Report, CS2015-15, pp. 33-38, July 2015

Non-Patent Document 2: Tomoaki OHTSUKI, "Communication Technology: Basic Knowledge and Its Trend [III]: Error-Correction Coding", The Journal of the Institute of Electronics, Information and Communication Engineers, vol. 90, no. 7, pp. 549-555, July 2007

Non-Patent Document 3: Hidekazu TAOKA et al., "MIMO and Coordinated Multipoint Transmission/Reception Technology in LTE-Advanced", NTT DOCOMO Technical Journal, vol. 18, no. 2, pp. 22-30.

Non-Patent Document 4: Akihiro SAITO et al., "Development of Multi-Base-Station Cooperative Transmission System", Panasonic Technical Journal, vol. 58, no. 4, pp. 20-25, January 2013

SUMMARY OF INVENTION

Problems to be Solved by the Invention

In conventional SPP signal transmissions, the signals transmitted from the RRHs 92 to the BBU 93 are all LLR values (soft decision values), regardless of whether or not CoMP is to be performed on the signals transmitted from the RRHs 92 to the BBU 93. The LLR values are real values that are calculated for each (1 bit) of the information bits, and must be quantized as several bits for each LLR value. For this reason, a transmission capacity that is the number of information bits multiplied by the number of quantization bits becomes necessary between the RRHs 92 and the BBU 93. For example, if a 1 Gbps (Giga bits per second) radio signal is received by an RRH 92 and the number of quantization bits of the LLR values is 5, then the transmission data volume between the RRH 92 and the BBU 93 will be 5 Gbps. However, the signals for which CoMP is not to be performed do not need to be transmitted as LLR values. Thus, in conventional SPP signal transmission, there was a problem in that signals for which CoMP is not to be performed are transmitted as LLR values, thereby unnecessarily increasing the transmission data volume between the RRHs 92 and the BBU 93.

In view of the abovementioned circumstances, the present invention has the purpose of providing a technology that can reduce the transmission data volume between RRHs and a BBU.

Means for Solving the Problems

An aspect of the present invention is a radio communication system including a radio apparatus and a signal processing apparatus that function as a base station, the radio apparatus including: a channel estimation unit that, on the basis of a radio signal transmitted from a terminal apparatus, estimates channel information relating to a radio transmission path between the radio apparatus and the terminal apparatus; a demodulation unit that performs soft-decision demodulation of the radio signal on the basis of the channel information estimated by the channel estimation unit; a signal switching unit that, depending on the terminal apparatus that transmitted the radio signal, switches an output destination of a log likelihood ratio obtained by the soft-decision modulation between either a first path passing through a decoding unit that decodes the log likelihood ratio or a second path not passing through the decoding unit; and a transmission unit that transmits a signal output from the first path or the second path to the signal processing apparatus.

In the above-mentioned radio communication system, the signal switching unit may switch the output destination of the log likelihood ratio obtained from the radio signal transmitted from the terminal apparatus to the first path when base station cooperation is not to be performed on the terminal apparatus that transmitted the radio signal, and switch the output destination of the log likelihood ratio obtained from the radio signal transmitted from the terminal apparatus to the second path when base station cooperation is to be performed on the terminal apparatus that transmitted the radio signal.

In the above-mentioned radio communication system, the signal processing apparatus may include a notification unit that determines whether or not base station cooperation is to be performed on the terminal apparatus associated with the radio apparatus, and notifies the radio apparatus of a determination result; and the signal switching unit may determine whether or not base station cooperation is to be performed on the terminal apparatus that transmitted the radio signal on the basis of the determination result provided by the notification unit.

An aspect of the present invention is a radio communication method in a radio communication system including: a radio apparatus and a signal processing apparatus that function as a base station, the radio communication method including a channel estimation step wherein the radio apparatus, on the basis of a radio signal transmitted from a terminal apparatus, estimates channel information relating to a radio transmission path between the radio apparatus and the terminal apparatus; a demodulation step wherein the radio apparatus performs soft-decision demodulation of the radio signal on the basis of the channel information estimated in the channel estimation step; a signal switching step wherein the radio apparatus, depending on the terminal apparatus that transmitted the radio signal, switches an output destination of a log likelihood ratio obtained by the soft-decision modulation between either a first path passing through a decoding unit that decodes the log likelihood ratio or a second path not passing through the decoding unit; and a transmission step wherein the radio apparatus transmits a signal output from the first path or the second path to the signal processing apparatus.

Advantageous Effect of the Invention

With the present invention, it becomes possible to reduce the transmission data volume between RRHs and a BBU.

MODES FOR CARRYING OUT THE INVENTION

Figure 1:
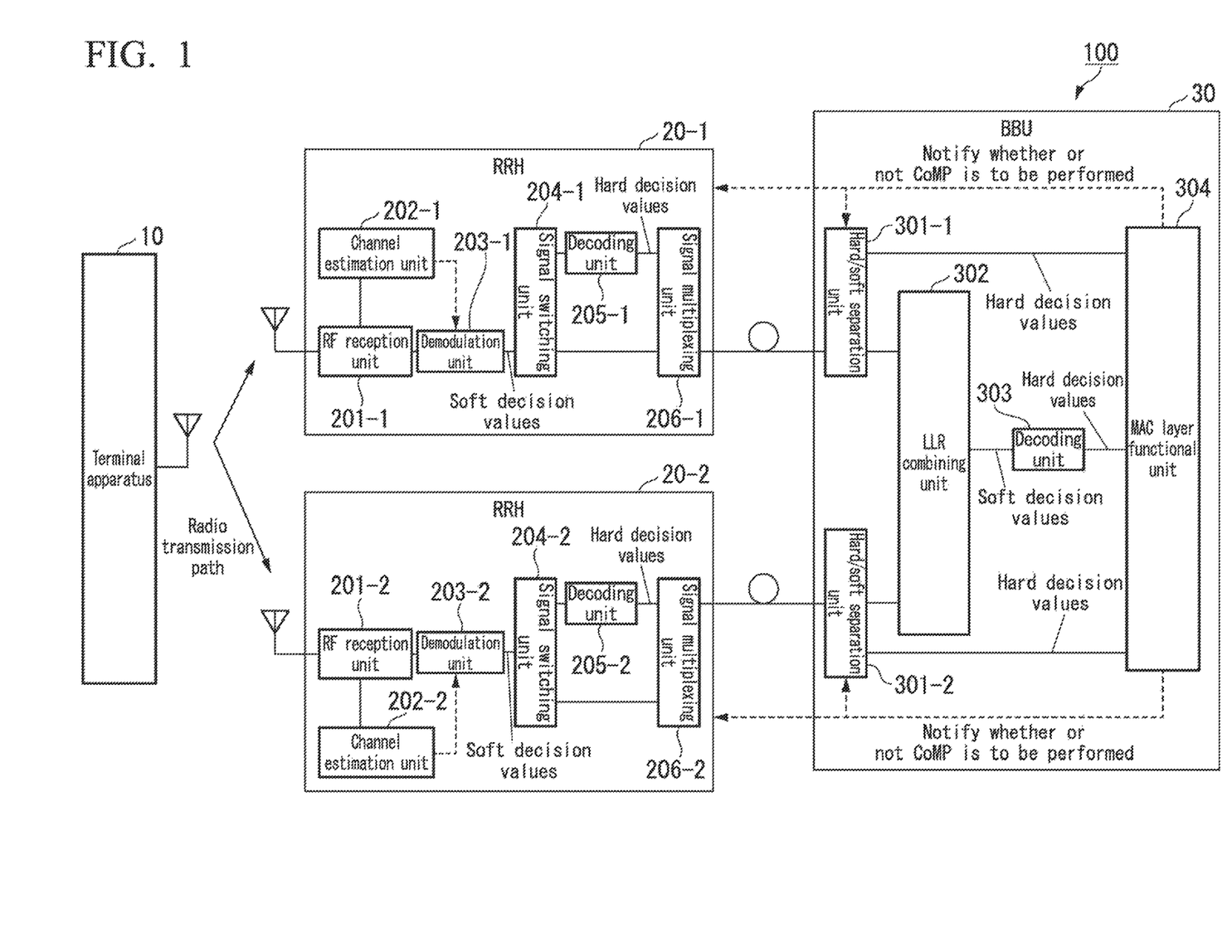
FIG. 1 is a configuration diagram showing the system configuration of a radio communication system 100 according to a first embodiment.

Hereinbelow, embodiments of the present invention will be explained with reference to the drawings.
(First Embodiment)
FIG. 1 is a configuration diagram showing a system configuration of a radio communication system 100 according to the first embodiment. The radio communication system 100 includes a terminal apparatus 10, multiple RRHs (radio apparatuses) 20-1 and 20-2, and a BBU (signal processing apparatus) 30. It is to be noted that in the following description, when making no particular distinction between the RRHs 20-1 and 20-2, they will be described as RRHs 20. The RRHs 20 and the BBU 30 function as a base station. The RRHs 20-1 and 20-2 and the BBU 30 are communicably connected by wire (for example, optical fiber or coaxial cable). Since the RRHs 20-1 and 20-2 have similar structures, the RRH 20-1 will be explained as an example.

The RRH 20 includes an RF reception unit 201-1, a channel estimation unit 202-1, a demodulation unit 203-1, a signal switching unit 204-1, a decoding unit 205-1, and a signal multiplexing unit (transmission unit) 206-1.

The RF reception unit 201-1 receives signals (radio signals) transmitted from the terminal apparatus 10. Of the received signals, the RF reception unit 201-1 outputs reference signals to the channel estimation unit 202-1, and outputs data signals to the demodulation unit 203-1.

The channel estimation unit 202-1 takes, as inputs, the reference signals output from the RF reception unit 201-1. The channel estimation unit 202-1 estimates the channel information and measures the reception quality on the radio transmission path on the basis of the input reference signals. The channel estimation unit 202-1 outputs the estimated channel information result and the reception quality measurement result to the demodulation unit 203-1.

The demodulation unit 203-1 takes, as inputs, the data signals output from the RF reception unit 201-1 and the channel information estimation result and the reception quality measurement result output from the channel estimation unit 202-1. The demodulation unit 203-1 uses the input channel information estimation result and reception quality measurement result to obtain LLR values (soft decision values) by performing equalization and soft-decision demodulation on the input data signals. The demodulation unit 203-1 outputs the obtained LLR values (soft decision values) to the signal switching unit 204-1.

The signal switching unit 204-1 takes, as inputs, the information regarding whether or not CoMP is to be performed provided by the BBU 30, and the LLR values output from the demodulation unit 203-1. The signal switching unit 204-1 switches the output destination of the LLR values on the basis of the input information regarding whether or not CoMP is to be performed. Specifically, the signal switching unit 204-1 switches, to the decoding unit 205-1 (i.e., to the first path passing through the decoding unit for decoding log likelihood ratios), the output destination of the LLR values obtained from signals transmitted from a terminal apparatus 10 for which CoMP is not to be performed, and switches, to the signal multiplexing unit 206-1 (i.e., to the second path not passing through the decoding unit), the output destination of the LLR values obtained from signals transmitted from a terminal apparatus 10 for which CoMP is to be performed.

The decoding unit 205-1 takes, as inputs, the LLR values output from the signal switching unit 204-1. The decoding unit 205-1 restores signal bit data (hard decision values) by decoding the input LLR values. The decoding unit 205-1 outputs the restored signal bit data to the signal multiplexing unit 206-1.

The signal multiplexing unit 206-1 takes, as inputs, the LLR values output from the signal switching unit 204-1 and the signal bit data (hard decision values) output from the decoding unit 205-1. The signal multiplexing unit 206-1 generates a multiplexed signal by multiplexing the input LLR values (soft decision values) and the signal bit data (hard decision values), and transmits the generated multiplexed signal to the BBU 30. It is to be noted that if there is one terminal apparatus 10 as shown in FIG. 1, the signal multiplexing unit 206-1 transmits multiplexed signals including either the LLR values (soft decision values) or the signal bit data (hard decision values) to the BBU 30.

The BBU 30 includes a hard/soft separation unit 301-1, a hard/soft separation unit 301-2, an LLR combining unit 302, a decoding unit 303, and a MAC layer functional unit (notification unit) 304.

The hard/soft separation unit 301-1 and the hard/soft separation unit 301-2 receive the multiplexed signals transmitted from the RRHs 20. The hard/soft separation unit 301-1 and the hard/soft separation unit 301-2 separate the received multiplexed signals into signal bit data and LLR values on the basis of the information regarding whether or not CoMP is to be performed, provided from the MAC layer functional unit 304. The hard/soft separation unit 301-1 and the hard/soft separation unit 301-2 output the signal bit data to the MAC layer functional unit 304 and output the LLR values to the LLR combining unit 302.

The LLR combining unit 302 takes, as inputs, the LLR values output from the hard/soft separation unit 301-1 and the hard/soft separation unit 301-2. The LLR combining unit 302 combines the input LLR values and outputs the combined LLR values to the decoding unit 303.

The decoding unit 303 takes, as inputs, the combined LLR values output from the LLR combining unit 302. The decoding unit 303 decodes the combined LLR values that have been input to restore the signal bit data (hard decision values). The decoding unit 303 outputs the restored signal bit data to the MAC layer functional unit 304.

The MAC layer functional unit 304 determines, on the basis of signals transmitted beforehand from a terminal apparatus 10, whether or not CoMP is to be performed for the terminal apparatus 10 that transmitted the signals. The determination as to whether or not CoMP is to be performed for the terminal apparatus 10 is made by using an existing technique (see, for example, above-mentioned Non-Patent Document 4). The MAC layer functional unit 304 notifies the RRHs 20 associated with the terminal apparatus 10 that transmitted the signals, the hard/soft separation unit 301-1, and the hard/soft separation unit 301-2, beforehand, of information indicating whether or not CoMP is to be performed on the terminal apparatus 10 that transmitted the signals.

With the radio communication system 100 configured in the above manner, an RRH 20 obtains, from the BBU 30, a notification indicating whether or not CoMP is to be performed for a terminal apparatus 10 in its own cell, and on the basis of the obtained notification, transmits the signals transmitted from the terminal apparatus 10 for which CoMP is not to be performed to the BBU 30, not as LLR values, but as signal bit data. Therefore, the LLR values do not need to be quantized for signals transmitted from a terminal apparatus 10 for which CoMP is not to be performed, allowing the transmission data volume between the RRHs 20 and the BBU 30 to be reduced.

<Modified Examples>

In the present embodiment, there may be multiple terminal apparatuses 10. Additionally, in the present embodiment, there may be three or more RRHs 20.

The signal conversion used in the signal transmissions between the RRHs 20 and the BBU 30 may use an existing interface, or may use a special interface. Additionally, after RF reception in the RRHs 20, the received signals may be processed for multi-carrier signal reception such as OFDM (Orthogonal Frequency Division Multiplexing).

(Second Embodiment)

Figure 2:
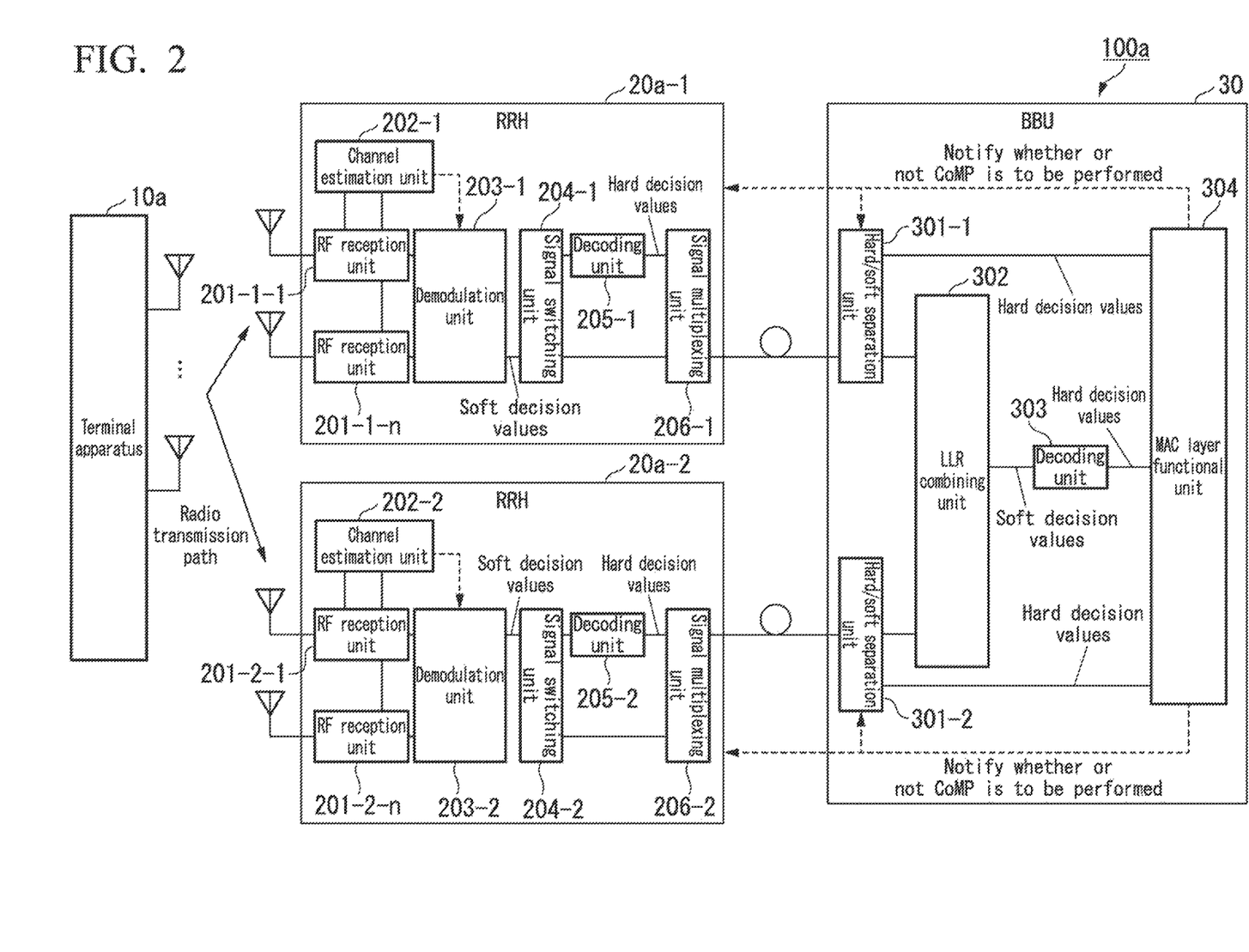
FIG. 2 is a configuration diagram showing the system configuration of a radio communication system 100a according to a second embodiment.

FIG. 2 is a configuration diagram showing a system configuration of a radio communication system 100a according to the second embodiment. The radio communication system 100a includes a terminal apparatus 10a, multiple RRHs 20a-1 and 20a-2, and a BBU 30.

In the second embodiment, the terminal apparatus 10a and the RRHs 20a are provided with multiple antennas, and MIMO (Multiple-Input Multiple-Output) transmissions are performed between the terminal apparatus 10a and the RRHs 20a. When the radio communication system 100a is configured in this manner, the RRHs 20a include multiple RF reception units 201-1-1 to 201-1-n (where n is an integer greater than or equal to 2), and the processing in the demodulation unit 203-1 also includes signal reception processing using multiple antennas. It is to be noted that the processing in the channel estimation unit 202-1, the signal switching unit 204-1, the decoding unit 205-1, and the signal multiplexing unit 206-1 is the same as that in the first embodiment.

With the radio communication system 100a configured in the above manner, it is possible to obtain advantageous effects similar to those of the first embodiment.

Additionally, with the radio communication system 100a, it becomes possible to reduce the transmission data volume between the RRHs 20a and the BBU 30 even for MIMO transmission.

<Modified Examples>

The second embodiment may be modified in a manner similar to the first embodiment.

All or some of the RRHs 20, the RRHs 20a, and the BBU 30 in the aforementioned embodiments may be realized in a computer. For example, it is possible to realize the RRHs and the BBU by recording programs for respectively realizing the constituent elements of the RRHs and the BBU in computer-readable recording media, loading the programs recorded on these recording media in a computer system, and running the programs. It is to be note that the "computer system" mentioned here includes OSs (Operating Systems) and hardware such as peripheral devices. Additionally, the "computer-readable recording media" refer to portable media such as flexible disks, magneto-optic disks, ROM (Read-Only Memory) and CD (Compact Disc)-ROMs, and also to storage apparatuses, such as hard disks, installed internally in the computer system. Furthermore, the "computer-readable recording media" may include those that dynamically hold the programs for a short time, such as communication cables when the programs are transmitted over a network such as the internet or over a communication line such as a telephone line, and in this case, they may include those that hold the programs for a certain period of time, such as volatile memories inside a computer system used as a server or a client. Additionally, these programs may be for the purpose of realizing some of the aforementioned constituent elements, and furthermore, the aforementioned constituent elements may be able to be realized by being combined with programs that are already recorded in the computer system, or may be realized by using hardware such as PLDs (Programmable Logic Devices) or FPGAs (Field Programmable Gate Arrays).

As described above, embodiments of the present invention have been explained in detail by referring to the drawings, but the specific structures are not limited to those in these embodiments, and designs and the like within a range not departing from the gist of the present invention are included.

INDUSTRIAL APPLICABILITY

The present invention is applicable, for example, to radio communications. With the present invention, it is possible to reduce the transmission data volume between RRHs and a BBU.

DESCRIPTION OF REFERENCE SYMBOLS 10, 10a, 91 . . . terminal apparatus
20, 20-1, 20-2, 20a, 20a-1, 20a-2, 92-1, 92-2 . . . RRH
30, 30a, 93 . . . BBU
201-1, 201-2, 201-1-1 to 201-1-$n$, 201-2-1 to 201-2-$n$, 921-1, 921-2 . . . RF reception unit
202-1, 202-2, 922-1, 922-2 . . . channel estimation unit
203-1, 203-2, 923-1, 923-2 . . . demodulation unit
204-1, 204-2 . . . signal switching unit
205-1, 205-2 . . . decoding unit
206-1, 206-2 . . . signal multiplexing unit
301-1, 301-2 . . . hard/soft separation unit
302 . . . LLR combining unit
303 . . . decoding unit
304 . . . MAC layer functional unit
931-1, 931-2 . . . signal separation unit
932 . . . LLR combining unit
933, 934, 935 . . . decoding unit
936 . . . MAC layer functional unit

The invention claimed is:

1. A radio communication system comprising a radio apparatus and a signal processing apparatus that function as a base station,
the radio apparatus comprising:
a channel estimation circuit that, on the basis of a radio signal transmitted from a terminal apparatus, estimates channel information relating to a radio transmission path between the radio apparatus and the terminal apparatus;
a demodulator that performs soft-decision demodulation of the radio signal on the basis of the channel information estimated by the channel estimation circuit;
a signal switch that, depending on the terminal apparatus that transmitted the radio signal, switches an output destination of a log likelihood ratio obtained by the soft-decision modulation between either a first path passing through a decoder that decodes the log likelihood ratio or a second path not passing through the decoder; and
a transmitter that transmits a signal output from the first path or the second path to the signal processing apparatus.

2. The radio communication system according to claim 1, wherein the signal switch switches the output destination of the log likelihood ratio obtained from the radio signal transmitted from the terminal apparatus to the first path when base station cooperation is not to be performed on the terminal apparatus that transmitted the radio signal, and switches the output destination of the log likelihood ratio obtained from the radio signal transmitted from the terminal apparatus to the second path when base station cooperation is to be performed on the terminal apparatus that transmitted the radio signal.

3. The radio communication system according to claim 2, wherein the signal processing apparatus comprises a notification unit that determines whether or not base station cooperation is to be performed on the terminal apparatus associated with the radio apparatus, and notifies the radio apparatus of a determination result, and
the signal switch determines whether or not base station cooperation is to be performed on the terminal apparatus that transmitted the radio signal on the basis of the determination result provided by the notification unit.

4. A radio communication method in a radio communication system comprising a radio apparatus and a signal processing apparatus that function as a base station, the radio communication method comprising:
a channel estimation step wherein the radio apparatus, on the basis of a radio signal transmitted from a terminal apparatus, estimates channel information relating to a radio transmission path between the radio apparatus and the terminal apparatus;
a demodulation step wherein the radio apparatus performs soft-decision demodulation of the radio signal on the basis of the channel information estimated in the channel estimation step;
a signal switching step wherein the radio apparatus, depending on the terminal apparatus that transmitted the radio signal, switches an output destination of a log likelihood ratio obtained by the soft-decision modulation between either a first path passing through a decoding unit that decodes the log likelihood ratio or a second path not passing through the decoding unit; and
a transmission step wherein the radio apparatus transmits a signal output from the first path or the second path to the signal processing apparatus.

* * * * *